(12) United States Patent
Roberson

(10) Patent No.: US 6,417,119 B1
(45) Date of Patent: Jul. 9, 2002

(54) FABRIC AND FABRIC ARTICLE MADE FROM PLANT MATERIAL

(76) Inventor: Sang Roberson, 215 Ocean Shore Blvd., Ormond Beach, FL (US) 32176

( * ) Notice: Subject to any disclaimer, the term of this patent is extended or adjusted under 35 U.S.C. 154(b) by 0 days.

(21) Appl. No.: 09/342,023

(22) Filed: Jun. 28, 1999

(51) Int. Cl.⁷ .................................................. A47G 1/12
(52) U.S. Cl. ..................... 442/149; 47/41.01; 47/58.01; 427/4; 428/13; 428/14; 428/15; 428/16; 428/17; 428/18; 428/19; 428/20; 428/21; 428/22; 428/23; 428/24; 428/25; 428/26; 428/27; 428/34; 428/34.5; 428/35.6; 428/38.6; 428/46; 428/67; 428/68; 428/70; 428/74; 428/203; 428/205; 428/354; 428/532; 428/537.5; 428/542.2; 428/542.4; 428/542.6; 442/104; 442/152
(58) Field of Search ............................... 428/13–27, 34, 428/34.5, 35.6, 38.6, 46, 67, 68, 70, 74, 354, 203, 205, 913.3, 532, 537.5, 542.2, 542.4, 542.6; 442/104, 152, 149; 47/41.01, 58.01; 427/4

(56) References Cited

U.S. PATENT DOCUMENTS

| 417,284 A | 12/1889 | Reinherz |
| 472,980 A | 4/1892 | Brown |
| 1,084,858 A | 1/1914 | Heeren |
| 2,105,688 A | 1/1938 | Fessenden |
| 2,783,568 A | 3/1957 | Robinson |
| 3,298,881 A | 1/1967 | Higley et al. |
| 3,672,950 A | 6/1972 | Murphy et al. |
| 3,718,529 A | 2/1973 | Coleman et al. |
| 4,147,826 A | 4/1979 | Kaleta |
| 4,272,580 A | 6/1981 | de Zepeda-Bermudez |
| 4,885,037 A | 12/1989 | Ohkubo |
| 5,354,395 A | 10/1994 | Fernandez et al. |
| 5,433,803 A | 7/1995 | Kwan et al. |
| 5,456,776 A | 10/1995 | Noguchi |
| 5,595,828 A | 1/1997 | Weber et al. |
| 5,622,786 A | 4/1997 | Weber et al. |
| 5,662,970 A | 9/1997 | Noguchi |
| 5,759,463 A | 6/1998 | Chang |
| 6,322,862 B1 * | 11/2001 | Sakai .......................... 428/13 |

* cited by examiner

Primary Examiner—Cheryl A. Juska
Assistant Examiner—Arti R. Singh
(74) Attorney, Agent, or Firm—Holland & Knight LLP

(57) ABSTRACT

A fabric having plant material adhered between layers of silk or hand-made paper. The silk or paper layers are translucent to allow the fabric to have the appearance of plant material. The fabric is manufactured by soaking dry plant material in water, pressing and drying the plant material to flatten it, adhering bottom and top layers of silk or paper to the plant material, and applying a stiffening agent to the fabric. Articles of various shapes may be formed by shaping the fabric into a predetermined shape prior to the step of applying the stiffening material.

7 Claims, 1 Drawing Sheet

FABRIC AND FABRIC ARTICLE MADE FROM PLANT MATERIAL

BACKGROUND OF THE INVENTION

This invention relates generally to the field of fabric and to articles made of fabric, and more particularly to a method of making a fabric and an article made of the fabric having the appearance of a plant material.

It is well known that fabric having the appearance of a plant is useful for many applications. Fabric having the appearance of leaves has been used as a camouflage, and fabric having the appearance of leaves and/or flowers has been used for its decorative properties. Many processes are known for applying stain or coloring to a fabric to create a plant image, or for weaving a fabric of multiple colors to create a plant image. However, such processes produce only a simulation of the plant or flower. In many decorating applications, it would be preferable to have a more natural plant-like appearance in the fabric. Ideally, actual plant material would be used as a fabric, however, such organic material is not practical as a fabric. Untreated plant material will degrade or rot if left in its natural state. It is known to dry plant material to preserve it, however, a dried plant is brittle and irregularly shaped and is not useful as a textile material. What is needed is a fabric material having a more natural plant-like appearance.

SUMMARY OF THE INVENTION

In light of the limitations of the prior art, it is an object of the present invention to provide a process for making a fabric and a fabric covered article from actual plant material in a manner that preserves the appearance of the plant material in the fabric. It is a further object of the present invention to provide a fabric and an article covered with the fabric made of actual plant material wherein the fabric retains the appearance of the plant material.

To meet these and other objects of the invention, a process is provided for forming a laminate fabric having the appearance of plant material, the process comprising the steps of: providing dried plant material; soaking the plant material in water; pressing the plant material against a flat surface while drying the plant material; adhering a first side of the plant material to a bottom sheet of a paper or silk material or other natural fiber; and adhering a second side of the plant material opposed the first side to a top sheet of a translucent paper or silk material or other natural fiber to form a laminate fabric. Further, a fabric is provided comprising a bottom layer of paper or silk; an intermediate layer of flattened dried plant material adhered to the bottom layer, and a top layer of translucent paper or silk adhered to the intermediate layer.

DETAILED DESCRIPTION OF THE INVENTION

Figure 1:
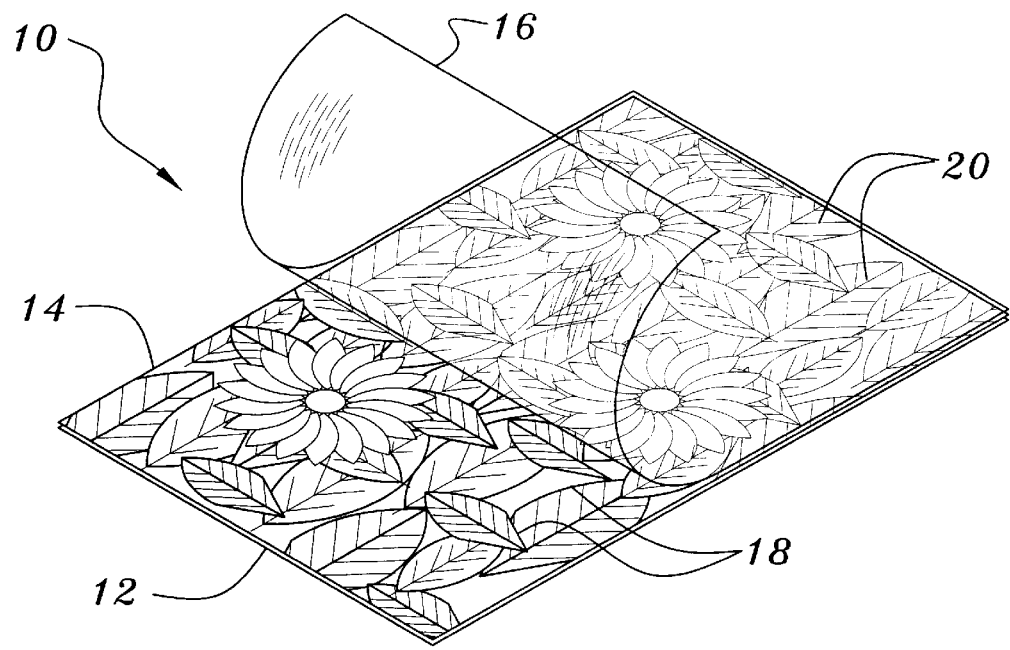
FIG. 1 illustrates a fabric manufactured in accordance with the present invention.

FIG. 1 illustrates a fabric having the appearance of a natural plant material and manufactured in accordance with the present invention. Fabric 10 is a three layer laminate material having a bottom layer 12, an intermediate layer 14, and a top layer 16. Bottom layer 12 and top layer 16 are each illustrated as a single sheet of a translucent or transparent paper or silk material, although more than one sheet may be used in either layer. Top layer 16 is preferably translucent so that the pattern of intermediate layer 14 can be seen. Bottom layer 12 may be translucent, transparent or opaque. Intermediate layer 14 is a layer of flattened, dried plant material. The three layers 12, 14, 16 are adhered together to form a single, flexible fabric 10 having the appearance of a natural plant material.

The plant material selected for intermediate layer 14 may be any of several organic materials selected for their visual and physical properties. In certain embodiments the plant material forming the intermediate layer 14 may be a plurality of leaves, such as lotus leaves, elephant ear leaves, traveler palm leaves, banana leaves, calladium leaves, seagrape leaves, or bamboo leaves. Preferably the plant material is non-succulent, non-fleshy, translucent, desiccated plant material. Leaves or flowers may be selected for use in intermediate layer 14 in order to provide a pleasing visual appearance in the fabric 10. In one embodiment a plurality of leaves are used having translucent body portions 18 and visible vein portions 20.

Bottom sheet 12 and top sheet 16 are selected from materials that are thin, strong, and preferably translucent. Bottom sheet 12 and top sheet 16 may be a hand made paper, such as rice paper, banana paper, or onion skin paper, or may be a thin, translucent machine made wood-based paper or other natural fiber. In one embodiment bottom sheet 12 and top sheet 16 are each a layer of silk. Bottom sheet 12 and top sheet 16 may be formed of the same material or may be formed of different materials. The inventor has successfully used Kizukishi paper available from The Paper Source, Chicago Ill., and Tengucho paper. In one embodiment bottom sheet 12 is selected from a thicker, stronger paper or silk material to provide additional strength to fabric 10 while top sheet 16 is selected from a thinner, more transparent material in order to heighten the visibility of intermediate layer 14.

Fabric 10 is manufactured by first providing a dried plant material for use in preparing intermediate layer 14. As described above, the dried plant material may be a plurality of dried leaves. It is desirable to utilize a dried plant material so that the plant material is subject to little or no shrinkage once formed into intermediate layer 14. The dried plant material is soaked in water to soften the material, then pressed against a flat surface while being dried in order to flatten the plant material. In one embodiment, the inventor has placed the soaked plant material between two layers of an absorbent material, such as newspaper, and pressed the plant material and absorbent material between two boards by placing a weight on top of the top board. It may be desirable to change the absorbent material periodically to enhance the drying process and to avoid the formation of mold on the organic material. It is desirable to dry the plant material until it is dry to the touch but not so dry as to become brittle, in order to ensure flexibility of the plant material during the manufacturing process. The applicant has found that a drying period of approximately three days at room temperatures provides adequate results. The soaked plant material may also be flattened, in addition or alternatively, by being pressed against a flat surface while being heated, for example by ironing the moistened plant material with a warm iron. An absorbent material may be placed against the plant material during this process to draw moisture away from the plant material as the heat is being applied.

The plant material is then adhered to the bottom layer 12 of silk or paper or other natural fiber. In the embodiment of FIG. 1, a plurality of leaves is illustrated as having been trimmed and fit together so that the bottom sheet 12 is covered completely with a single layer of plant material. A single layer of plant material is desirable because it provides a visible plant appearance to the fabric while at the same time allowing a maximum amount of light to pass through the fabric. The intermediate layer 14 is adhered to the bottom sheet 12 by applying an adhesive to one or both of the layers before pressing them together. The adhesive may be any material compatible with organic and botanical materials, such as Usiki Seal, available from The Lamp Shop of Concord, N.H., or a diluted hobby glue such as Sobo, available from Delta Technical Co., Inc., of Whittier, Calif., or Tacky, available from the Aileen Company. The adhesive is preferably water-based but may be a non-water based product. The applicant has also used polyvinyl acetate glue available from Light Impressions of Rochester, N.Y. The adhesive may be applied to one side of the plant material 14 and/or bottom sheet 12 with a soft bristle or foam brush or may be applied as a spray. Once the adhesive is applied and the bottom layer 12 and intermediate layer 14 are joined together, it is preferable to smooth this two-layer laminate against a flat surface, such as by rolling the two-layer laminate with a brayer. Similarly the top layer 16 is adhered to the two-layer laminate by applying an adhesive and pressing the layers together to form the three layer laminate forming fabric 10.

In one embodiment the adhesive may be colored to provide an enhanced visual appearance to fabric 10. A coloring agent, such as food coloring for example, may be mixed into the adhesive to form a colored, translucent adhesive. The colored translucent adhesive may be used to adhere one or both of the bottom sheet 12 and the top sheet 16 to the intermediate layer 14.

Once the adhesive is dry, fabric 10 is suitable for use as is. Optionally, a stiffening material, such as styrene, polyurethane glue or starch for example, may be applied to at least a portion of the fabric 10 in order to decrease the flexibility of fabric 10. A stiffer fabric may be more useful for certain applications, such as for a lamp shade as discussed in more detail below.

Figure 2:
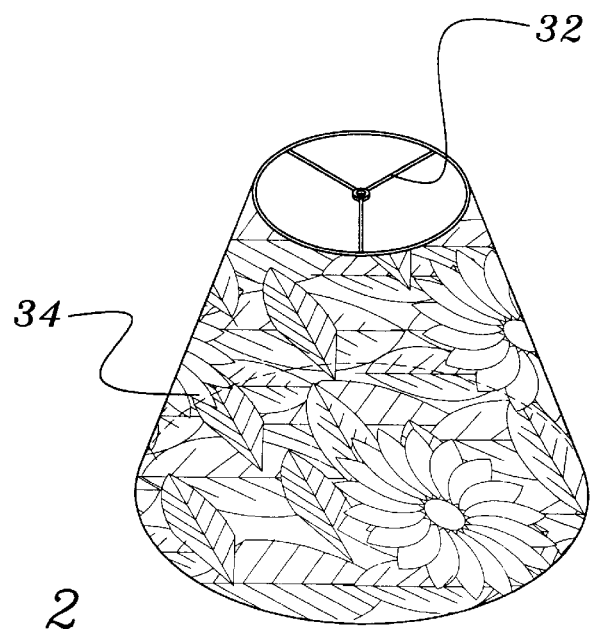
FIG. 2 illustrates a lamp shade formed from the fabric of FIG. 1.

FIG. 2 illustrates a lamp shade 30 constructed from a fabric made in accordance with the present invention. Lamp shade 30 has an top ring frame 32 to provide support for the shade and an appropriate shape. The lamp shade body portion 34 is formed from a fabric made in accordance with the present invention. Fabric 10 of FIG. 1 may be formed into a predetermined shape, such as the body portion 34 of lamp shade 30, prior to the step of applying a stiffening agent to the fabric 10. Once a desired shape is obtained, the stiffening material is applied to a least a portion of the fabric 10 to hold the fabric 10 in the predetermined shape. For the embodiment of a lamp shade 30 as illustrated in FIG. 2, the fabric 10 forming body portion 34 will have sufficient rigidity to preclude the need for any additional support framing other than top ring frame 32. Other embodiments of a fabric covered article utilizing the fabric 10 in accordance with the present invention may include but are not limited to a book cover, a purse, a greeting card, or a portfolio. Importantly, articles manufactured in accordance with the present invention have the appearance of natural plant material while having the durability and flexibility of a laminate paper or silk product.

The embodiments illustrated herein are provided by way of example, not limitation. Accordingly, the full scope of the applicants invention is as described in the claims below.

I claim as my invention:

1. A fabric comprising:

a bottom layer of natural fiber;

an intermediate layer of flattened dried plant material forming a sheet that completely covers and is co-extensive with the bottom layer and being adhered to the bottom layer by a water-based adhesive, and a top layer of non-opaque natural fiber adhered to the intermediate layer by said water-based adhesive.

2. The fabric of claim 1 wherein said adhesive comprises, a colored non-opaque water-based adhesive applied between the intermediate layer and the bottom and top layers.

3. The fabric of claim 1, further comprising a stiffening material applied to at least a portion of at least one of the bottom and top layer.

4. The fabric of claim 3, further comprising the fabric being formed into a predetermined shape, and a stiffening material applied to at least a portion of the fabric to hold the fabric in the predetermined shape.

5. The fabric of claim 4, wherein the stiffening material is selected from the group of styrene, polyurethane glue, and starch.

6. The fabric of claim 1, wherein the natural fiber comprises one of is selected from the group of rice paper, banana paper, and onion skin paper.

7. The fabric of claim 1, wherein the bottom layer comprises a relatively thicker, stronger material when compared to the top layer comprising a relatively thinner, non-opaque material.

* * * * *